June 28, 1960 D. BROIDO 2,942,778
DATA PROCESSING MACHINES

Filed May 1, 1957 3 Sheets-Sheet 1

INVENTOR
DANIEL BROIDO
BY
ATTORNEYS

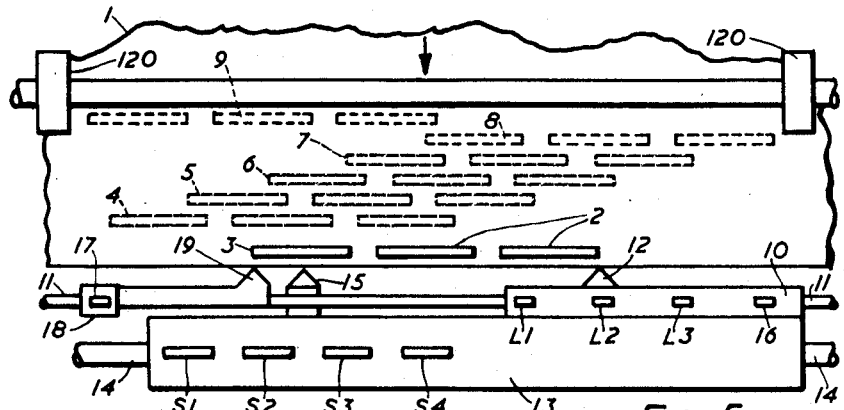
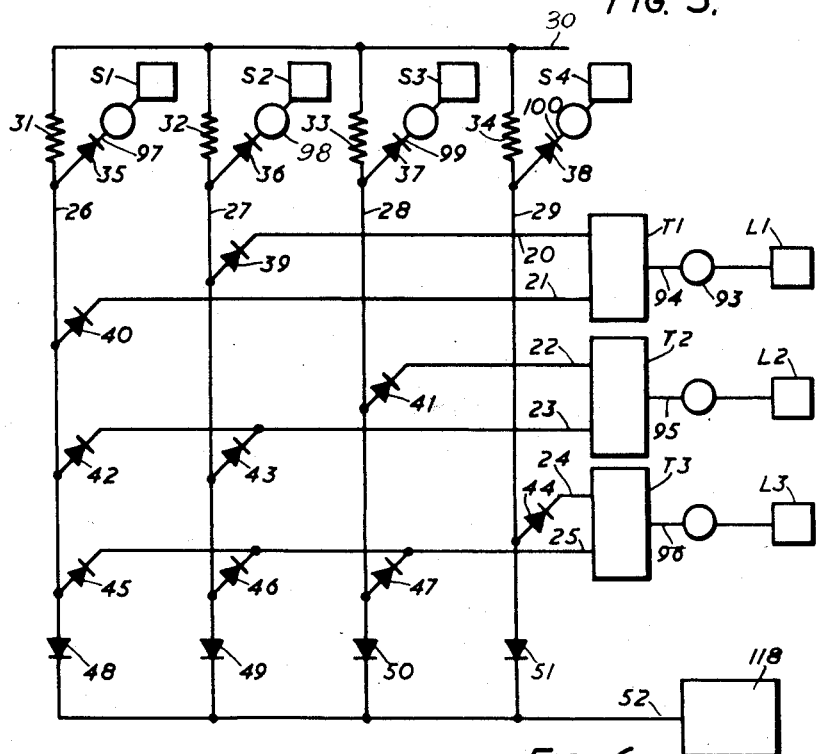
FIG. 5.
FIG. 6.
INVENTOR
DANIEL BROIDO
BY Hauer and Nydich
ATTORNEYS June 28, 1960 D. BROIDO 2,942,778
DATA PROCESSING MACHINES
Filed May 1, 1957 3 Sheets-Sheet 3
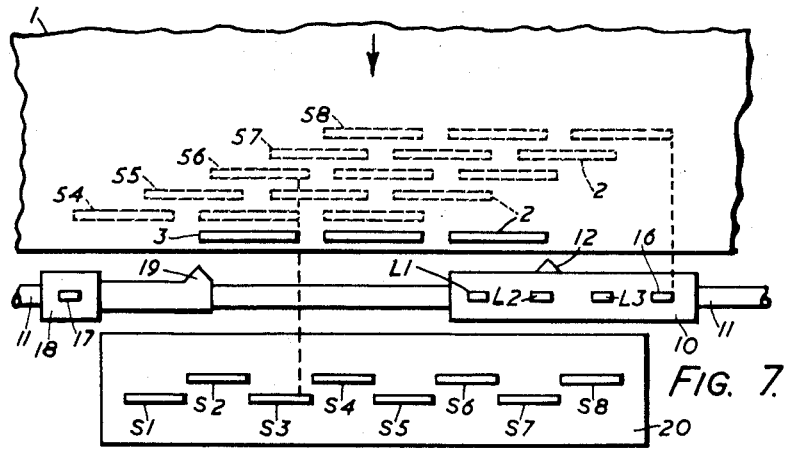
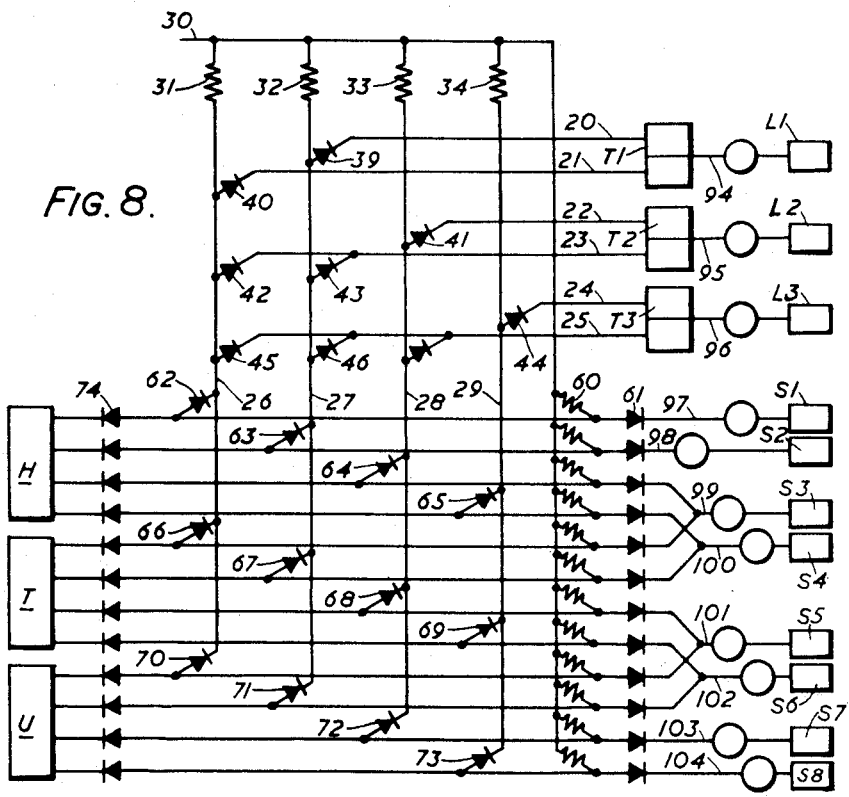
INVENTOR
DANIEL BROIDO
BY
ATTORNEYS

United States Patent Office 2,942,778
Patented June 28, 1960

2,942,778

DATA PROCESSING MACHINES

Daniel Broido, Cockfosters, near Barnet, England, assignor to International Computers and Tabulators Limited, London, England, a British company Filed May 1, 1957, Ser. No. 656,405

Claims priority, application Great Britain May 22, 1956

10 Claims. (Cl. 235—61.11)

The present invention relates to data processing machines of the type adapted to analyse or interpret data patterns printed, punched or otherwise recorded, and more specifically to devices in such machines for compensating for positional inaccuracy of data patterns as presented to sensing means in such machines.

The term "record" will be used with reference to an assemblage of data patterns representative of information which is required to be analysed or interpreted in a data processing machine for example, digits representing an account number or business transaction. A record of this kind is carried by a data-bearing member, which may be a discrete unit, for example, a document or card, where separate documents or cards are prepared for each item of information, or it may be a continuous medium, for example continuous stationery or tape, whereon several records are separately made and an indication is provided to mark the commencement of each record.

The records are usually entered into data processing machines by feeding the data-bearing members into the machines, the feeding means having associated with it a means for sensing the record. Where these sensing devices are positioned relative to the feeding means it is obvious that the record must be accurately aligned with the sensing means, or alternatively the sensing means must be tolerant to any positional inaccuracy of the record.

Such positional inaccuracy may occur in at least two forms. First, the record may be inaccurately positioned on the member. This may be due to the record being made subsequent to the preparation of the member for example data-representing marks being applied to a document during the course of a business-transaction. Secondly, the data bearing member itself may be inaccurately positioned in the feeding means of the processing machine, for example, a document inaccurately aligned when it is inserted into the machine. This latter misalignment may also be affected by two factors. The member may be presented to the feeding means in a correct angular relation but displaced to one side of the true feeding line, or the member may be presented to the feeding means at an angle to the feeding line.

It is an object of the present invention to provide in data processing machines wherein record bearing members are fed and sensed, means for correctly sensing records consisting of data patterns despite positional inaccuracy of the records, which inaccuracy lies between predetermined limits.

It is a further object of the invention to provide means for correctly sensing records consisting of data patterns whose position may vary from a nominal location by lateral or by angular displacement.

According to the invention there is provided apparatus for sensing a data pattern of a record including at least two sensing devices, each sensing device being adapted to be operated when a pattern is sensed, alignment detecting means adapted to produce a signal indicating the position of the record relative to said sensing means and means responsive to said signal for rendering one of said sensing devices effective to control a utilisation device. The invention may also be applied to a plurality of sensing devices, each sensing device being adapted to be operated by an integer of the data pattern and a group of the sensing devices being effective to control a similar group of utilisation devices.

The invention will now be described, by way of example, with reference to the accompanying drawings, in which:

Figure 5 shows an embodiment of the invention for use in a document sorting machine.

Figure 6 shows schematically the control circuits associated with the embodiment of Figure 5.

Figure 7 shows an embodiment of the invention for use in a document tabulating machine.

Figure 8 shows schematically the control circuits associated with the embodiment of Figure 7.

Figure 1:
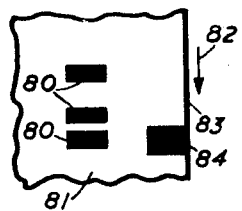
Figures 1, 2, 3 and 4 show examples of recorded data patterns.
Figures 2, 3:
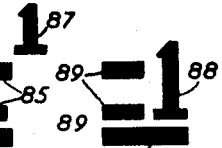

Figure 1 is an example of a single group of three bar-like marks 80, forming a data integer, on a document 81. The document is moved, in the direction of arrow 82, past sensing heads and the marks 80 are scanned. It will be apparent that if the document is not correctly aligned relative to the sensing head the marks 80 may not be scanned correctly, or may not be scanned at all. If the marks are made in a position which always bears a fixed relationship to the edge 83 of the document, then this edge may be detected, for example, by photo-electric means, and a resultant signal used to select a sensing head which is correctly aligned with the marks 80. In order that the edge of the document may more readily be detected, marks such as 84 may be printed in a predetermined relationship to the data pattern, or a strip may be provided along the edge of the document. This method of marking a document may be used when the document is originally manufactured, but where a data pattern is imprinted after the document is in use it is not always possible to ensure that the pattern is correctly positioned. Figure 2 shows a group of marks 85 and 86 of this kind which may be incorrectly positioned on the document. In this case the mark 86 may be used to ensure that the data is correctly sensed in accordance with the present invention, and may also itself form part of the data-representing group. A symbol 87 may also be associated with the marks to provide a visually readable representation of the coded data.

Figure 4:

An alternative data representing group is shown in Figure 3, where a symbol 88 and marks 89 and 90 which represent it are provided in one block. In this case the mark 90 is used as a reference mark for the purpose of selecting a sensing head, and also forms, with the marks 89 the data representing group to be sensed. Figure 4 shows another form of this kind of data group, where a symbol itself includes a reference part 91 and also a pattern of marks 92, which in this case are blank portions of a continuous mark.

In all the above cases the term "mark" has been used with reference to the individual parts of a data representing group, but it will be appreciated that these parts may be in various forms provided that they are able to be sensed by an appropriate sensing device. For example, the marks may be dark areas on a light background or light areas on a dark background, or holes in the data bearing member, all of which may be sensed by photoelectric means. Alternatively the marks may be conductive or may be holes, in which case they may be sensed by electrical means. Marks may also take the form of discrete magnetic areas in a data bearing members having remanent magnetic properties, in which case the sensing devices would comprise magnetic sensing heads.

By way of example, the invention will be described as applied to a document bearing a printed data pattern comprising data-representing integers arranged in columns across the document. Each integer includes marks of the form shown in Figure 2 in which a mark corresponding to that referenced 86 is used to indicated the position of each integer on the document. The marks in each column corresponding to 86 will be considered in describing the invention, but it is to be understood that for an integer to have data significance each of these marks is accompanied by a further mark or marks. The data-bearing document is fed into a data processing machine by means of a conventional feeding mechanism, but since this mechanism does not form part of the invention, it will not be described in detail.

Figure 5 shows a data sensing arrangement suitable for use in a document sorting machine, for example. Each document fed past the sensing arrangement may carry several recorded data integers, each integer corresponding to one digit of a multi-digit number, for example. One data integer is sensed from each document to control sorting of that document comparable to the single column sensed at a time in a conventional punched card sorter.

A document 1 (Fig. 5) carries three data integers. For the sake of clarity only one mark 2 of each integer is shown in the drawing, although each integer consists of, say, three marks comparable with the layout shown in Fig. 1. The three integers are arranged side by side in a horizontal direction as shown in Figure 5.

The normal position of the integers relative to the sensing arrangement in a horizontal direction is indicated at 3 by the full line showing of the marks 2. Inaccuracies in printing of the marks and/or in feeding of a document may cause the three integers to appear in horizontal displaced positions such as are indicated at 4 to 9 by dotted outlines of the marks 2.

The document 1 is fed in the direction of the arrow by feeding rollers 120 so that the marks are first detected by alignment-detecting means such as photocells L1, L2, L3, 16 and 17 and then sensed by sensing means such as photocells, S1, S2, S3 and S4. The feeding rollers 120 are driven in conventional manner by the feeding mechanism of the machine.

The alignment detecting cells L1, L2, L3 and 16 are mounted on a block 10 which is initially manually displaced along a fixed rail 11 to preset the positioning of the cells, so that a pointer 12 is aligned with the extreme right hand end of the normal position 3 of the data pattern.

The sensing cells S1—S4 are mounted in a similar block 13 which is manually displaced along a fixed rail 14, to select which integer of the data pattern is to be sensed for sorting purposes, the selected integer being indicated by a pointer 15, which is attached to the block 13. The pointer may be associated with a scale attached to the machine to provide an indication of the integer to be sensed. The position of pointer 15 in Fig. 5 shows that the left hand of one of the three integers has been selected for sensing.

Predetermination of the limits of misalignment which the arrangement will accept is effected by the positioning of cells 16 and 17. The position of cell 16 is fixed by the pre-setting of block 10. Cell 17 is mounted in a block 18 which is displaceable along rail 11, the pre-setting of this cell in the case illustrated being such that a pointer 19 associated therewith registers with the extreme left hand edge of the normally positioned data pattern 3.

When misalignment is such that either of the cells 16 or 17 detects any one of the marks 2 during the feeding of the document 1 through the sensing arrangement as in the cases of the mis-aligned integer positions indicated at 8 and 9, a rejection circuit (not shown) is brought into operation and the document on which the misalignment occurs is rejected by appropriate mechanism (not shown). Suitable circuits and mechanisms for performing this rejection are assumed to be well known and do not form part of the present invention. Alternatively, the rejection circuit may be used to prevent the output of the sensing cells being effective to control the sorting mechanism.

It will be clear from Fig. 5 that the relative positioning of the various cells is such that, as document 1 is fed, the line of marks 2 first crosses an imaginary line passing through the cells 16, 17, L1, L2 and L3 and then a line passing through the cells S1 to S4. Thus the first mark of each integer passes the line of alignment cells and then the line of sensing cells. It will be assumed that none of the marks are detected by the cells 16 and 17, which indicates that the degree of mis-alignment is not too great for the sensing arrangement to deal with. Some of the possible conditions as the marks pass the alignment cells will now be considered. For example, if the pattern is displaced to the position indicated at 4 none of the cells L1, L2 or L3 is affected by the marks. A control circuit, to be described later in connection with Figure 2, is arranged so that under this condition the sensing cell S1 is rendered operative, while the cells S2, S3 and S4 are rendered inoperative. Thus the extreme left hand integer of the data pattern is sensed. With the data pattern in the position indicated at 5 cell L1 detects the extreme right hand integer of the pattern as document 1 is advanced and the control circuit renders cell S2 operative and the others inoperative so that once again the extreme left hand integer is sensed. Similarly, with the pattern in the positions indicated at 6 and 7, cells L2 and L3 detect the extreme right hand integer and cells S3 and S4 are rendered operative.

It will thus be seen that, within the limits set by the positions of cells 16 and 17, data patterns can be laterally misaligned to varying extents and in all cases the desired pattern integer, as selected by the pre-setting of block 13, is sensed.

The output signals from the alignment detecting and sensing cells are applied to the control matrix shown in Figure 6. The output from the cell L1 is passed by an amplifier 93 to the input line 94 of a trigger circuit T1. The outputs of cells L2 and L3 are similarly applied to the inputs 95 and 96 of trigger circuits T2 and T3 respectively. These trigger circuits are shown schematically in Figure 6 and each have two output lines. The two outputs of each trigger circuit are connected to horizontal matrix lines 20 to 25 which in turn are selectively connected to vertical matrix lines 26 to 29 by diodes 39 to 47.

The lines 26 to 29 are connected to a common high-potential supply line 30 through individual resistors 31 to 34, and to input lines 97 to 100, via diodes 35 to 38. The sensing cells S1 to S4 are connected through amplifiers to the lines 97 to 100 respectively. Lines 97 to 100 normally have a low potential applied to them by the associated amplifier output which rises when their associated sensing cells sense a mark 2, so that normally the lines 26 to 29 are held at this low potential by the diodes 35 to 38 respectively.

In the absence of any output on lines 94 to 96 the triggers T1 to T3 apply low potential to lines 20, 22 and 24 and high potential to lines 21, 23 and 25. Each of the lines 27, 28 and 29 is therefore connected to a low potential output of one of the triggers T1 to T3. If the line 98 rises in potential because the cell S2 senses one of the marks 2, the diode 36 will be cut off and the line 27 remains at the low potential. In a similar manner, the cells S3 and S4 are unable to cause a rise in potential on the lines 28 and 29, respectively, when the triggers T1 to T3 are in this condition. However, the line 26 is not connected to a low potential output from the triggers. Consequently, if the line 97 rises in potential, the line 26 also rises until it reaches a value equal to the high potential output of the trigger, whereupon the diodes 40, 42 and 45 conduct and prevent any further rise. The rise in potential of the line 26 is applied to a utilization device 118, such as a sorting control circuit, via diode 48 and line 52. Thus the diode mesh acts effectively as a switch which selects one of the sensing cells S1 to S4 for connection to the utilization device 118, the particular cell selected being dependent upon the setting of the triggers T1 to T3.

If a signal is applied to trigger T1 on line 94, from the cell L1, the potentials on lines 21 and 20 are reversed, so that diode 40 holds line 26 to the low potential of line 21 and diode 39 fails to exert any holding effect on line 27. Diodes 41 and 44 function as in the previous case, so that upon sensing the pattern integers the potential on line 27 only is allowed to rise to cause output diode 49 to pass a signal to the output line 52, and the output from cell S2 is thus selected.

Similarly, if a signal is applied to trigger T2, the reversal of potentials on lines 23 and 22 causes diodes 42 and 43 to hold lines 26 and 27 to the low potential of line 23 and prevents diode 41 exerting any holding effect on line 28. Diode 44 functions as in the previous cases and the output from cell S3 is selected.

The application of a signal to trigger T3 reverses the potential on lines 24 and 25, so that diodes 45, 46 and 47 hold lines 26, 27 and 28 to the low potential of line 25, and the output from cell S4 is selected.

It is to be noted that even though a signal may be applied to trigger T1 or T2, a further signal applied to trigger T3 before any signals appear on lines 97 to 100 will override the effect of the earlier signal or signals, so that these triggers act as storage devices serving to compensate for angular misalignment, i.e. departure from parallelism between the line of pattern integers and the line of detector cells. This overriding effect is provided by the manner in which the diode is connected. The line 29 is held at a low potential by the low potential output of the trigger T3 only. Hence, only operation of the trigger T3 can release this line for control by the cell S4. Equally, the condition of the triggers T1 and T2 exerts no control on the state of the line 29. In a similar way, the trigger T1 exerts no control on the state of the line 28. The line can be released by operation of the trigger T2, but if the trigger T3 is also operated, then the line is held low by conduction through diode 49 to line 25 which will be at a low potential. Thus the release of each of the lines 27, 28 and 29 is controlled by the operation of one of the triggers T1 to T3, but the release is prevented by the operation of a trigger with a higher number than the controlling trigger. Release of the line 26 is prevented by operation of any of the triggers.

The limits of angular misalignment which can thus be tolerated are determined by the response of the detecting cells and by the spacing between such cells and the sensing cells. It will be understood that if the angular misalignment is such that in passing under a cell an integer fails to produce an adequate output signal, the storage effect of the triggers will not suffice to secure compensation. Again, if such misalignment results in an integer not being detected by the detection cells before another integer is being sensed, the compensation provided by the trigger will not be effective.

Whilst a matrix type of control circuit has been described, it will be understood that this is an exemplary embodiment and that other switching arrangements of known type could equally well be used to effect control of the sensing devices in dependence upon the operation of the detecting devices.

The description has so far been concerned with a case in which the document is fed past the alignment cells L1 to L3 and is subsequently sensed by the cells S1 to S4.

The invention is also applicable to data processing machines in which the document or other data bearing member is sensed while it is stationary. In this case alignment detecting cells are provided in blocks similar to the block 10, a separate block being provided for each possible position on the document where a line of pattern integers may occur, and a particular block is selected to correspond to the pattern that is required to be sensed. Alternatively a single block may be provided and positioned to correspond to the required position to detect the marks such as that referenced 86 in Figure 2.

Associated with each block corresponding to 10 is a second block corresponding to 13 which in this case contains for each columnar position a group of sensing cells instead of the single cells shown at S1 to S4. The number of cells in each group corresponds to the number of possible positions in which a mark may be recorded for each integer of the pattern. The arrangement of these cells is such that they bear the same columnar relationship to the cells corresponding to L1 to L3 as do the cells S1 to S4 in Figure 5, but within each column group the cells are so spaced that they sense the data representing marks of an integer, for example the marks 85 in Figure 2.

The data bearing member in a machine of this kind may be manually inserted or it may be automatically fed into the machine and brought to rest at a predetermined sensing position.

A second embodiment of the invention, applicable to a tabulating machine, is shown in Figure 7 in which the same references are used for the same parts as in Figure 5. The normal position of the data pattern is shown at 3 and five laterally misaligned patterns are indicated at 54 to 58. In place of the displaceable block 13 carrying four sensing cells S1 to S4 there is provided a fixed block 20 carrying eight sensing cells S1 to S8, and a modified control circuit described later in connection with Figure 8 is used.

With the data pattern misaligned to the extent indicated at 54 none of the cells L1 to L3 are affected by the advancing pattern and cell 17 which determines the extreme left hand limit of permissible misalignment is only partly obscured by the left hand integer of the pattern, so that the reject circuit is not operated. The control circuit ensures that under these conditions sensing cells S1, S3 and S5 are rendered effective and feed their outputs to utilization devices of appropriate significance.

With the data pattern in the position indicated at 55 cell L1 detects the extreme right hand integer of the pattern and cells S2, S4 and S6 are rendered effective; with the pattern positioned as at 56, cell L2 is affected and cells S3, S5 and S7 are consequently rendered effective; with the pattern positioned as at 57, cell L3 is affected and cells S4, S6 and S8 rendered effective, and with the pattern positioned at 58, the right hand limiting cell 16 is obscured and serves to operate the reject arrangements. It is to be understood that all the cells S1 to S8 are operative for sensing, but only the output of those required is selected by the control circuit and the corresponding cells thus rendered effective.

The control circuit for this second embodiment is shown in Figure 8 and comprises a matrix type switching circuit of which the input lines referenced 94 to 96 are affected by cells L1 to L3 respectively, and the lines referenced 97 to 104 are affected by cells S1 to S8 respectively, of Figure 7.

It will be noted that the upper part of the matrix differs only from the matrix of Figure 6 in that the input lines from the sensing cells are not connected to the lines 26 to 29, and in view of this similarity like references have been used for like parts in the two figures.

The input lines 97, 98, 103 and 104 are each connected to a single horizontal matrix line in the lower part of the figure, and the input lines 99 to 102 are each connected to a pair of such lines, the connections being made via isolating diodes such as 61. Each one of the horizontal lines is connected to the high potential supply line 30 through a resistor 60 and is further connected via a diode such as 74 to an appropriate one of three utilization devices indicated by the blocks H, T and U, which have different significance, e.g. hundreds, tens and units. It will be seen that the connections are such that lines 99 to 102 can be connected to either one of two of the registration devices, whilst lines 97, 98, 103 and 104 can only be connected to a single one of these devices.

The selection of these possible connections is determined by diodes 62 to 73 which are rendered conductive or non-conductive in dependence upon the potentials applied to the vertical and horizontal lines of the lower part of the matrix. It will be recalled from the description of Figure 6 that the potentials on lines 26 to 29 are determined by the states of the triggers T1 to T3, and as previously mentioned, the normal potential applied to the horizontal lines is that of the supply line 30.

Thus in the four cases of no input on lines 94 to 96 input on line 94, input on line 95, and input on line 96 each of the vertical matrix lines 26 to 29 in turn carries a high potential whilst the others carry a low potential. The effect of the high potential on line 26 and the horizontal lines is to render diodes 62, 66 and 70 non-conducting, whilst the effect of the low potential on lines 27 to 29 and the high potential on the horizontal lines is to render diodes 63 to 65, 67 to 69, and 71 to 73 conducting with the result that only signals appearing on lines 97, 99 and 101 can pass through the matrix to the registration devices, and in relation to the latter two signals only the paths to the utilization devices T and U respectively are open to them.

Similarly the effect of a high potential on one of the lines 27 to 29 with a low potential on the other is to render the associated group of three of the diodes 62 to 73 non-conducting and the remainder conducting, thus switching signals on lines 97 to 104 to appropriate ones of the devices H, T and U, or suppressing them, as the case may be.

The trigger circuits T1, T2 and T3 have the same storage and overriding effect as in Figure 6 and thus provide the same compensation for a limited degree of angular misalignment. If, for example, the document is fed past the sensing heads displaced so that the rows of integers constituting the data pattern are not parallel to the axis of the photocells these storage and overriding effects are effective to select the appropriate horizontal lines in the following manner. The group of marks in the position 57 has been shown to actuate the two alignment-detecting cells L2 and L3. Both triggers T2 and T3 are set, and the trigger T3 is effective to override the setting of the trigger T2. If the document has been fed into the machine so that it is turned in a clockwise direction as viewed in Figure 7 the marks are at an angle to the sensing heads and the cell L3 detects the presence of a mark before the cell L2, thereby selecting the correct matrix vertical line 29. If the document is turned in a counter-clockwise direction, the cell L2 detects the mark before cell L3, but the setting of the trigger T3 overrides the selection made by the trigger T2 and the correct matrix line is selected. However, the angular misalignment of the marks relative to the sensing heads is important in that it sets a limit to the correction which the overriding properties of the triggers can make. If the angle of misalignment is the result of a counter-clockwise displacement the extreme left-hand integer of the pattern is brought nearer to the position in which it is sensed before the extreme right hand integer is detected by the cells L2 and L3. Thus the maximum angle of displacement that can be corrected is such that none of the integers of a pattern may reach any of the sensing cells S1 to S8 until the alignment-detection operation has been completed.

For the same reasons each of the sensing cells must have an independent timing sequence for the sensing of a pattern integer. For example, in sensing a group of marks forming a single integer the sensing device will signify the presence of one or more marks separated in time by an interval which is determined principally by the distance separating the marks on the data bearing medium and the speed with which the medium is fed past the sensing device. The time at which each mark in the integer is sensed, therefore, has significance in the entry of data. Where all sensing heads are operating in synchronism the times at which marks are sensed may conveniently be compared with a master timing circuit in the data processing machine, but where, as in the case of angular displacement, the marks are sensed by one device out of synchronism with the sensing of marks by another device, each sensing circuit must embody its own timing circuit.

Figure 9:
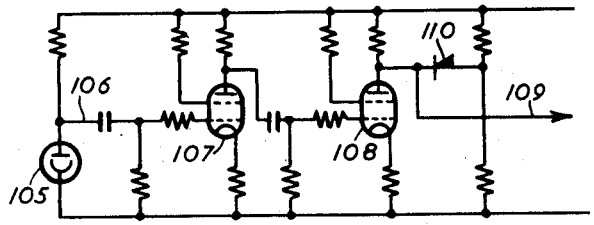
Figure 9 shows a circuit diagram of a photoelectric sensing head and its associated amplifier.
Figure 10:
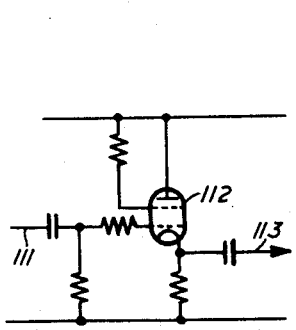
Figure 10 shows a circuit diagram of a signal input stage.

Figure 9 shows a typical amplifying circuit which may be used in conjunction with the photo-electric cells shown in the embodiment described with reference to Figures 5 to 8. A photocell 105 corresponds to any of the cells S1 to S8 or L1 to L3 of the embodiments described. When the cell 105 senses a mark the potential on its anode line 106 rises and is applied through a capacitive coupling to the control grid of an amplifying valve 107. A resultant negative going pulse at the anode of valve 107 is applied through a capacitive coupling to the control grid of a limiting valve 108, which is normally conducting. The application of the pulse to the valve 108 results in a positive pulse appearing on line 109 which is connected to the anode of valve 108. A diode 110 is provided in the anode circuit of the valve to prevent a pulse being passed to the line 109 when the signal applied to the amplifier by the cell 105 ceases at the end of a mark. The line 109 corresponds to one of the horizontal input lines to the matrix trigger circuits, for example the line referenced 94 in Figures 6 and 8. In the case of cells such as S1 to S8 of these figures, a further signal input stage, shown in Figure 10, is included in the amplifier, and the line 109 is connected to an input 111. The pulse on line 109 is applied to the control grid of a cathode follower valve 112 and a corresponding positive pulse is derived from the cathode of the valve and applied through a capacitive coupling to line 113. The line 113 corresponds to a vertical matrix input line, such as that referenced 97 in Figures 6 and 8.

Figure 11:
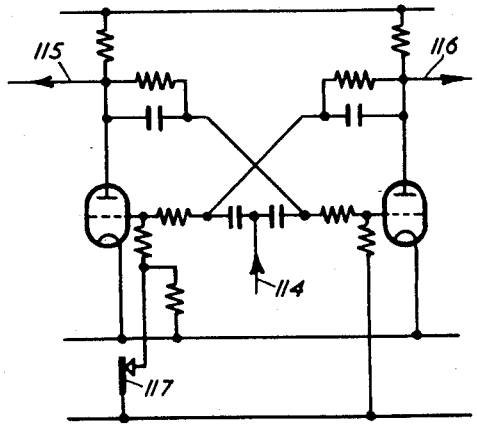
Figure 11 shows a circuit diagram of a trigger stage.

The triggers T1 to T3 shown in Figures 6 and 8 may each comprise a conventional trigger circuit such as that shown in Figure 11. The pulses from a horizontal input line such as that referenced 94 in Figures 6 and 8 are applied to the input of the trigger i.e. to line 114 of Figure 11. The trigger is initially set so that the left-hand valve is conducting and upon the application of a negative pulse on line 114 this valve ceases to conduct. A line 115 in the anode circuit of the left-hand valve corresponds to a normally low-potential matrix line, such as that referenced 20 in Figures 6 and 8 and its potential rises. The right-hand valve conducts when the anode potential of the left-hand valve rises and the potential of a line 116 in the right-hand anode circuit, corresponding to a line such as 21 in Figures 6 and 8, is lowered. The trigger circuit is reset after sensing each document. This resetting operation may be performed by the operation of a contact 117, which raises the grid potential of the left-hand valve and allows the valve to conduct.

It will be appreciated that other means may be used instead of triggers to control the potentials on the lines 20 and 21 of Figures 6 and 8. For example, a gas filled relay valve may be fired by an impulse on a line such as 94 (Figures 6 and 8). In this case the line 20 is connected to the cathode of the relay valve, the cathode being connected through a cathode load. The line 21 may be connected to a potential divider arranged between the anode of the relay valve and a negative supply line.

Whilst in the embodiment described with reference to Figure 8, the number of sensing cells has been arbitrarily chosen as eight, it will be appreciated that a greater number could be used to allow for a greater degree of misalignment, and that with a correspondingly more complex matrix quite wide divergence from normal positioning of the data pattern can be tolerated.

In the case shown, for example, it will be seen that an integer may partially overlap two or more sensing cells, and also that it is possible for an integer to fail to cover any one cell completely. By suitably modifying the proportions of the cells and the marks and increasing the number of cells used for sensing and alignment detecting it is possible to ensure that one sensing cell and only one is completely covered by one integer, the alignment detecting circuit then being arranged to select the output of that cell in respect of that integer. This enables the cell to function essentially as "on-off" devices.

Alternatively, instead of feeding the outputs of cells L1—L3 directly to triggers T1—T3 one of the well-known differential amplifier circuits may be used to utilise the difference between the outputs of cells L1—L3 and the output of a reference cell.

In the examples given the sensing cells are operatively connected to input lines to the matrix, and outputs from these lines are selected or inhibited according to the settings of the trigger circuits. However, the selection circuits may be modified so that the trigger circuits are connected to the amplifiers of the sensing cells so that only the cells selected are conditioned to produce an output. In this case, the output of all the sensing amplifiers (e.g. the lines 97 to 100 of Figure 6) are applied in parallel over a line such as 52 to a utilization device. A diode matrix may then be used similar to that shown in Figure 6, with the output lines (e.g. the lines 26 to 29) arranged to control the sensing amplifiers so that only the amplifier of the selected sensing cell is allowed to pass signals to the utilization device.

What is claimed is:

1. In apparatus for sensing an integer on a record, the integer having an indeterminate position relative to the apparatus perpendicular to the direction of feed of the record; the combination of first and second sensing stations, means for feeding said record past said stations, each said station including a plurality of individual sensing devices spaced apart in a direction transverse to the direction of feed and so positioned that each said station is capable of sensing an integer on any part of a single strip of said record, means controlled by said first station for generating a signal indicative of the position of said integer relative to said second sensing station, and means operated by said indicative signal for rendering effective that sensing device of said second sensing station past which said integer is fed.

2. In apparatus for sensing integers on a record, the integers having a predetermined positional relationship to one another but an indeterminate position relative to the apparatus in a direction perpendicular to the direction of feed of the record; the combination of first and second sensing stations, means for feeding said record past said stations, each said station including a plurality of individual sensing devices spaced apart in a direction transverse to the direction of feed and so positioned that each said station is capable of sensing an integer on any part of a single strip of said record, means controlled by said first station for generating a signal indicative of the position of said integers relative to said second sensing station, and means operated by said indicative signal for rendering effective a group of said sensing devices of said second sensing devices past which said integers are fed.

3. In combination with a record having thereon a data integer and a position indicating integer having a predetermined positional relationship to one another, sensing apparatus comprising a first sensing station, a second sensing station, means for feeding said record past said stations, said integers having an indeterminate position relative to the stations in a direction perpendicular to the direction of feed, each said station including a plurality of individual sensing devices spaced apart in a direction transverse to the direction of feed and so positioned that said first and second stations are capable of sensing said position indicating integer and said data integer respectively when fed in any part of predetermined respective strips relative to said stations, means controlled by said first station for generating a signal indicative of the position of said position indicating integer relative to said first sensing station, and means operated by said indicative signal for rendering effective a selected one of the sensing devices of said second sensing station for sensing said data integer.

4. In combination with a record having thereon a plurality of data integers and a position indicating integer having a predetermined positional relationship to one another; sensing apparatus for said record comprising a first sensing station, a second sensing station, means for feeding said record past said stations, said integers having an indeterminate position relative to said stations transversely to the direction of feed, each said station including a plurality of individual sensing devices spaced apart in a direction transverse to the direction of feed and so positioned that said first and second stations are capable of sensing said position indicating integer and said data integers respectively wherever placed within prescribed lateral limits relative to said stations, means controlled by the sensing devices of said first sensing station for generating a signal indicative of the position of said integers relative to said sensing stations, and means operated by said indicative signal for rendering effective a selected group of sensing devices out of said sensing devices of said second station, for sensing said data integers.

5. In combination with a record having a plurality of integers spaced apart transversely on the record; sensing means for the record comprising feed means for feeding the record in a direction transverse to the spacing of said integers which have an indeterminate position transverse to the direction of feed, a first sensing station, a second sensing station adjustable transversely to the direction of feed to select for sensing one of said integers, each said sensing station comprising a plurality of individual sensing devices spaced apart transversely of the direction of feed, means controlled by said sensing devices of said first sensing stations for generating a signal indicative of the position of said integers relative to said second sensing station, and means operated by said indicative signal for rendering operative one of said sensing devices of said second sensing station for sensing the selected integer.

6. In combination with a record having an integer thereon; sensing apparatus comprising a first sensing station, a second sensing station, means for feeding said record past said sensing stations, said integer having an indeterminate position relative to said sensing stations in a direction transverse to the direction of feeding of said record, each said sensing station comprising a plurality of individual sensing devices spaced apart transversely of the feed direction and located so that each sensing station is capable of sensing an integer disposed anywhere within prescribed lateral limits, means controlled by said sensing devices of said first sensing device for generating a signal indicative of the position of said integer relative to said second station, means operated by said indicative signal for rendering effective that sensing device of said sensing device past which said integer is fed, means for generating a control signal on the sensing of said integer, by any said sensing device of said second station rendered effective, a bi-stable device controlled by said first sensing station, a utilization device, and means controlled by said bi-stable device for controlling the application of said control signal to said utilization device.

7. In combination with a record having an integer thereon; sensing apparatus comprising a first sensing station, a second sensing station, means for feeding said record past said sensing stations, said integer having an indeterminate position relative to said sensing stations in a direction transverse to the direction of feeding of said record, each said sensing station comprising a plurality of individual sensing devices spaced apart transversely of the feed direction and located so that each sensing station is capable of sensing an integer disposed anywhere within prescribed lateral limits with respect to the respective station, a plurality of bi-stable devices, means controlled by the sensing of an integer by said sensing devices of said first station for selectively operating said bi-stable devices, in accordance with the position of said integer with respect to said second station, means controlled by said bi-stable devices for rendering effective at least one of said sensing devices of said second station for sensing said integer.

8. In combination with a record having an integer thereon; sensing apparatus comprising a first sensing station, a second sensing station, means for feeding said record past said sensing stations, said integer having an indeterminate position relative to said sensing stations in a direction transverse to the direction of feeding of said record, each said sensing station comprising a plurality of individual sensing devices spaced apart transversely of the feed direction and located so that each sensing station is capable of sensing an integer disposed anywhere within prescribed lateral limits with respect to the respective station, a plurality of bi-stable devices, means controlled by the sensing of an integer by said sensing devices of said first station for selectively operating said bi-stable devices in accordance with the position of said integer with respect to said second station, a diode matrix controlled by said bi-stable devices, means for applying to said diode matrix signals generated by said sensing devices of said second station in response to the sensing of an integer, whereby one of said generated signals is selected as an output signal.

9. In combination with a record having thereon a data integer and a position indicating mark having a prescribed relative positional relationship; sensing apparatus comprising a first sensing station, a second sensing station, means for feeding said record past said sensing stations, said integer and said mark having an indeterminate position relative to said sensing station in a direction transverse to the direction of feeding of said record, each said sensing station comprising a plurality of individual sensing devices spaced apart transversely of the feed direction and located so that said first sensing station and said second sensing station are capable of sensing said mark and said integer respectively anywhere within prescribed lateral limits with respect to the respective station, a plurality of bi-stable devices, means controlled by the sensing of said mark by said sensing devices of said first station for selectively operating said bi-stable devices in accordance with the position of said integer with respect to said second station, a diode matrix, means for applying to said diode matrix signals generated by said sensing devices of said second station in response to the sensing of said integer, and means operated by said bi-stable devices for controlling said diode matrix for selecting as an output signal the signal generated by said sensing device of said second station corresponding to the position of said integer.

10. In combination with a record having thereon an integer comprising a plurality of marks to be sensed sequentially and at least one utilization device actuated by signals sensed from said record; sensing apparatus comprising a first sensing station, a second sensing station, means for feeding said record past said sensing stations whereby said marks are sensed sequentially, said marks having an indeterminate position transversely of the feed direction with respect to said stations, each said sensing station comprising a plurality of individual sensing devices spaced apart transversely of the feed direction and located so that each sensing station is capable of sensing a mark disposed anywhere within prescribed lateral limits with respect to the respective station, means controlled by the sensing of a mark by said sensing devices of said first station for generating a signal indicative of the position of said marks with respect to said second station, means controlled by said indicative signal for rendering effective a selected sensing device of said second station past which selected device said marks are fed, and timing means included in said utilization device operable to determine significance of signals generated by said selected sensing device or sensing of said marks successively.

References Cited in the file of this patent
UNITED STATES PATENTS

| | | |
|---|---|---|
| 2,288,770 | Armbruster | July 7, 1942 |
| 2,620,978 | Carroll et al. | Dec. 9, 1952 |
| 2,687,253 | McMillan | Aug. 24, 1954 |
| 2,698,427 | Steele | Dec. 28, 1954 |
| 2,704,634 | Rauch | Mar. 22, 1955 |

OTHER REFERENCES

"A Thyraton 'Scale of Two' Automatic Counter" (Wynn-Williams), published by Royal Society of London, Proceedings, 1932, Series A, vol. 136, pp. 312–24.